US012017408B2

(12) United States Patent
Masuda et al.

(10) Patent No.: US 12,017,408 B2
(45) Date of Patent: Jun. 25, 2024

(54) METHOD OF MANUFACTURING RESIN FORMED PRODUCT HAVING A LEATHER GRAIN

(71) Applicants: SOLIZE Corporation, Tokyo (JP); Honda Motor Co., Ltd., Tokyo (JP)

(72) Inventors: Ryota Masuda, Tokyo (JP); Kohei Mutai, Tokyo (JP); Hajime Kawamura, Tokyo (JP); Hiroyuki Ikeno, Tokyo (JP); Kazuo Igarashi, Tokyo (JP); Satoru Nishimoto, Tokyo (JP)

(73) Assignees: Honda Motor Co., Ltd., Tokyo (JP); Solize Corporation, Tokyo (JP)

(*) Notice: Subject to any disclaimer, the term of this patent is extended or adjusted under 35 U.S.C. 154(b) by 0 days.

(21) Appl. No.: 18/126,038

(22) Filed: Mar. 24, 2023

(65) Prior Publication Data

US 2023/0302726 A1    Sep. 28, 2023

(30) Foreign Application Priority Data

Mar. 25, 2022   (JP) ................. 2022-050728
Oct. 18, 2022   (JP) ................. 2022-167058

(51) Int. Cl.
*B29C 64/188*   (2017.01)
*B29C 64/386*   (2017.01)
*B33Y 10/00*    (2015.01)
*B33Y 40/20*    (2020.01)
*B33Y 50/00*    (2015.01)

(52) U.S. Cl.
CPC .......... *B29C 64/188* (2017.08); *B29C 64/386* (2017.08); *B29K 2995/0074* (2013.01); *B33Y 10/00* (2014.12); *B33Y 40/20* (2020.01); *B33Y 50/00* (2014.12)

(58) Field of Classification Search
None
See application file for complete search history.

(56) References Cited

U.S. PATENT DOCUMENTS 9,275,497 B2 *   3/2016   Kikuta ................... G06T 19/00

FOREIGN PATENT DOCUMENTS

EP     3725943 A1 * 10/2020 ............. B32B 7/09
JP     2017-104988      6/2017

OTHER PUBLICATIONS

DE 102004061615 translation (Year: 2005).*

* cited by examiner

*Primary Examiner* — Mary Lynn F Theisen
(74) *Attorney, Agent, or Firm* — POLSINELLI PC (57) ABSTRACT

A method of manufacturing a resin formed product having a leather grain includes: a 3D printing step of inputting printing data to a 3D printer, and printing an intermediate product having an intermediate grain that is a base of the leather grain; and a post processing step of obtaining the resin formed product, which is a finished product, by carrying out post processing on the intermediate product printed in the 3D printing step. A grain height in input data, which is the printing data inputted in the 3D printing step, is greater than or equal to 120% of a stacking pitch in the 3D printing step.

6 Claims, 11 Drawing Sheets

(a) SMALL STACKING PITCH    (b) LARGE STACKING PITCH    (c) ENLARGED GRAIN HEIGHT

(c) ENLARGED GRAIN HEIGHT (b) LARGE STACKING PITCH (a) SMALL STACKING PITCH

STACKING DIRECTION

TYPE 1

FIG.8

FIG.9 TYPE 3

METHOD OF MANUFACTURING RESIN FORMED PRODUCT HAVING A LEATHER GRAIN

CROSS-REFERENCE TO RELATED APPLICATION

This application claims priority from Japanese Patent Application No. 2022-050728, filed on Mar. 25, 2022, and Japanese Patent Application No. 2022-167058, filed on Oct. 18, 2022. The entire disclosure of each of the above applications is incorporated herein by reference.

TECHNICAL FIELD

The present disclosure relates to a method of manufacturing a resin formed product having a leather grain.

BACKGROUND ART

An inkjet method is known as a method relating to the molding of a leather grain form (see Patent Document 1).

PRIOR ART DOCUMENTS

Patent Documents

Patent Document 1: Japanese Patent Application Laid-Open (JP-A) No. 2017-104988

SUMMARY OF INVENTION

Technical Problem

By the way, in recent years, there has been the demand for the manufacturing of leather grain forms by using 3D printing.

The problem to be solved by the present invention is to improve the reproducibility of leather grain in a manufacturing method that manufactures a resin formed product having a leather grain by using 3D printing.

Solution to Problem

A manufacturing method relating to a first aspect is a method of manufacturing a resin formed product having a leather grain, the manufacturing method comprising: a 3D printing step of inputting printing data to a 3D printer, and printing an intermediate product having an intermediate grain that is a base of the leather grain; and a post processing step of obtaining the resin formed product, which is a finished product, by carrying out post processing on the intermediate product printed in the 3D printing step, wherein a grain height in input data, which is the printing data that is inputted in the 3D printing step, is greater than or equal to 120% of a stacking pitch in the 3D printing step.

Because there are problems with the printing accuracy of 3D printers, the grain shape (including the grain height) in input data and the grain shape at an article printed by 3D printing (the intermediate product) consequently do not coincide, and there are problems with reproducibility. The present inventors focused on the following issue as a factor inhibiting improvement in reproducibility of leather grain in a printing method using MJF 3D printing. Namely, the shape of the intermediate product is affected by the stacking pitch of the 3D printing, and if the stacking pitch is large, the accuracy deteriorates commensurately. Therefore, in a case in which the shape of a resin formed product that is to be manufactured is a fine shape such as a leather grain, the shape cannot be reproduced accurately. Therefore, in the present aspect, the grain height in the printing data (input data) that is inputted to the 3D printer in the 3D printing step is greater than or equal to 120% of the stacking pitch in the 3D printing step. Owing thereto, as compared with a case in which the grain height in the input data is less than 120% of the stacking pitch, the shape of the leather grain can be reproduced accurately in the intermediate grain, and, as a result, the reproducibility of the leather grain in the finished product can be improved.

In a manufacturing method relating to a second aspect, in the first aspect,
the grain height in the input data is greater than or equal to 200% of the stacking pitch.

In the present aspect, the grain height in the input data is greater than or equal to 200% of the stacking pitch. Therefore, the shape of the leather grain can be reproduced more accurately in the intermediate grain, and as a result, the reproducibility of the leather grain in the finished product can be improved more.

In a manufacturing method relating to a third aspect, in the first aspect,
a grain height of the leather grain of the resin formed product, which is the finished product, is from 70% to 130% of the stacking pitch, and the grain height in the input data is less than or equal to 300% of the stacking pitch.

In the present aspect, the grain height of the leather grain that the resin formed product, which is the finished product, is from 70% to 130% of the stacking pitch. Here, because the grain height in the input data is less than or equal to 300% of the stacking pitch, the post processing step can be facilitated.

In a manufacturing method relating to a fourth aspect, in the first aspect,
a grain height of the leather grain of the resin formed product, which is the finished product, is from 70% to 130% of the stacking pitch, and the grain height in the input data is from 200% to 300% of the stacking pitch.

In the present aspect, the grain height in the input data is from 200% to 300% of the stacking pitch. Therefore, the shape of the leather grain can be reproduced more accurately in the intermediate grain, and as a result, the reproducibility of the leather grain in the finished product can be improved more. Further, the post processing step can be facilitated.

In a manufacturing method relating to a fifth aspect, in any of the first through fourth aspects,
the manufacturing method further comprises a data preparing step of preparing the input data, wherein, in the data preparing step, the input data is prepared by expanding actual article data in a grain height direction.

In the present aspect, in the data preparing step, the input data is prepared by expanding actual article data in the grain height direction. Therefore, even if the grain height in the actual article data is low, the shape of the grain can be reflected in an exaggerated manner in the intermediate product, and as a result, the reproducibility of the leather grain in the finished product can be improved more.

Advantageous Effects of Invention

In accordance with the present invention, the reproducibility of leather grain can be improved in a manufacturing method that manufactures a resin formed product having a leather grain by using 3D printing.

DESCRIPTION OF EMBODIMENTS

A method of manufacturing a resin formed product having a leather grain (hereinafter simply called "manufacturing method") relating to an embodiment of the present invention is described hereinafter.

The manufacturing method relating to the present embodiment is based roughly on the following procedures.

(1) An actual article having a leather grain is scanned, and actual article data is prepared.

(2) The grain height of the actual article data is measured.

(3) The actual article data is processed, and data in which the grain height is changed (input data) is prepared.

(4) The input data is inputted to a 3D printer, and an intermediate product having an intermediate grain is printed.

(5) The printed intermediate product is subjected to post processings (surface removal treatment and the like), and a finished product is obtained.

The respective steps are described in detail next.

(1: Preparation of Actual Article Data)

In this step, an actual article having a leather grain is scanned, and actual article data is prepared.

Figure 7:
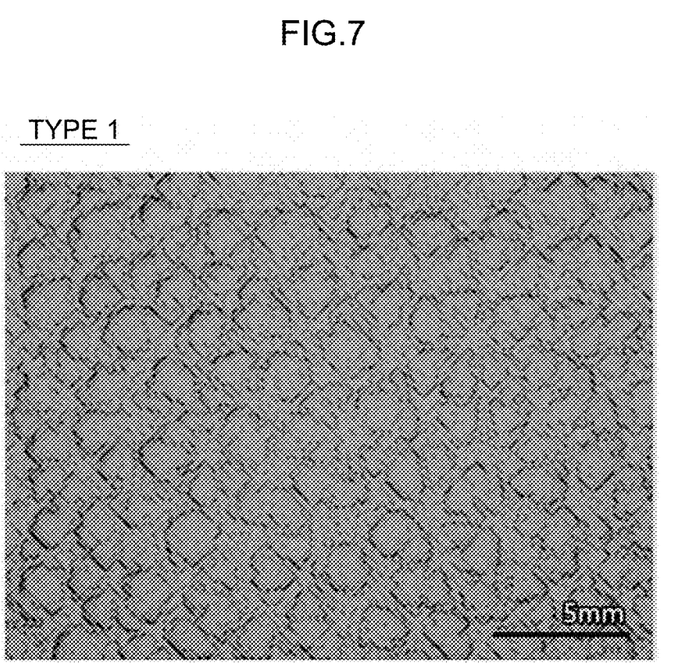
FIG. 7 is a photograph showing a Type 1 actual article.
Figure 8:
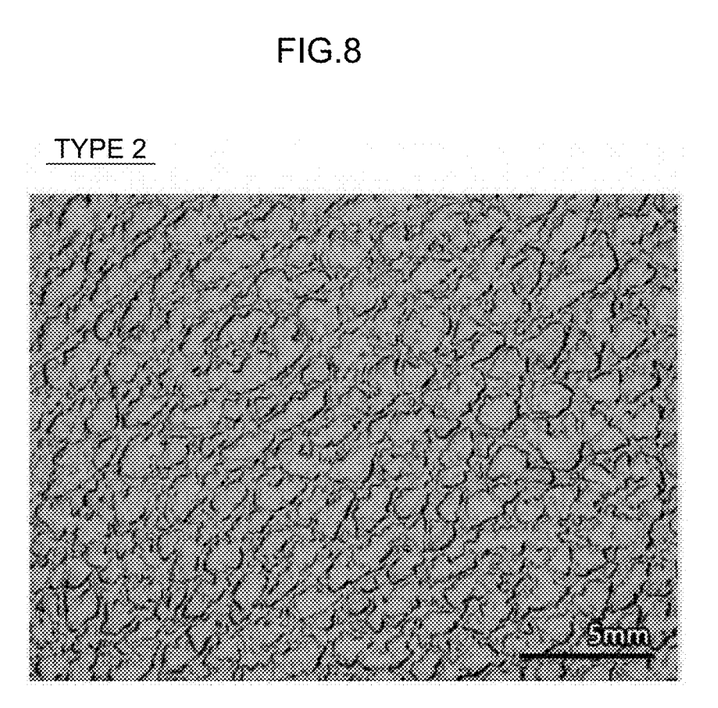
FIG. 8 is a photograph showing a Type 2 actual article.
Figure 9:
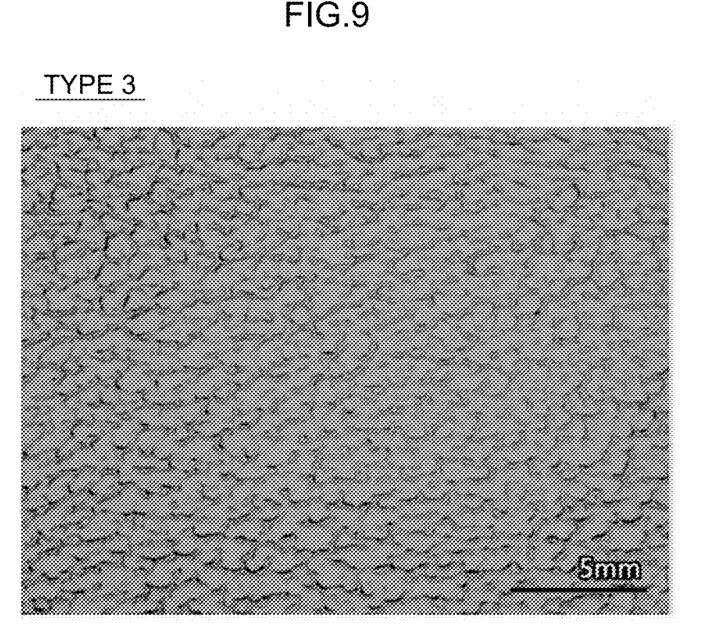
FIG. 9 is a photograph showing a Type 3 actual article.

The actual article is an object having a leather grain that is to be reproduced by the printing method of the present invention. Leather grain means a three-dimensional wrinkled pattern on the surface of leather or a wrinkled pattern that is made to resemble this. Examples of actual articles are illustrated in FIG. 7 through FIG. 9.

(2: Measurement of Grain Height of Actual Article)

In this step, the grain height of the actual article data is measured.

Grain height means the height of the peaks of the grain, and specifically, means the difference in height between the vertices and the bottom surfaces of the peaks of the grain.

The method of measuring the grain height is not particularly limited, and is the following method for example.

Figure 6:
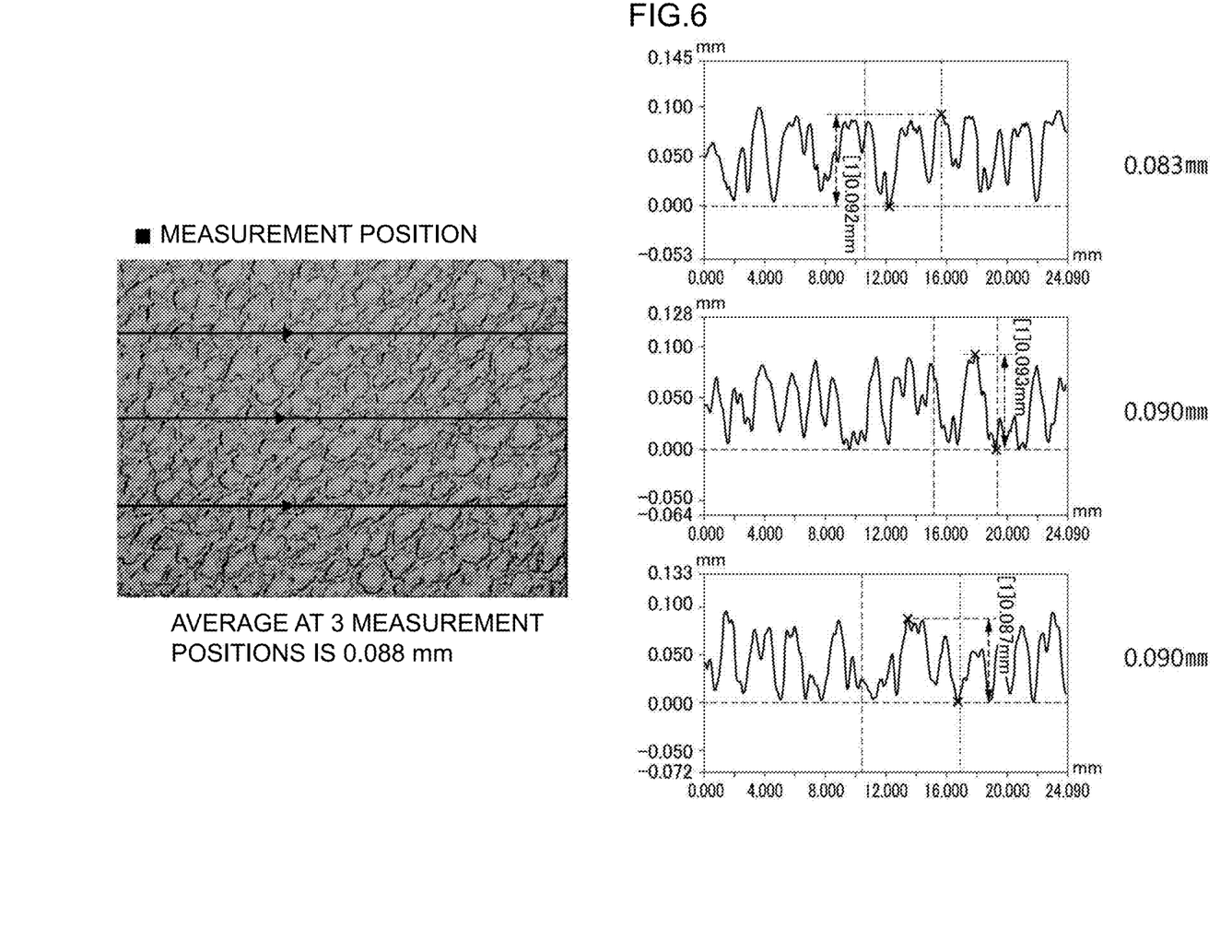
FIG. 6 is a drawing explaining an example of a method of measuring grain height.

Namely, as illustrated in FIG. 6, the height distributions at plural (three in the drawing) measurement positions are acquired, and the average of the maximum height differences at the respective measurement positions is used as the grain height.

(3: Preparation of Input Data)

In this step, by expanding the actual article data in the grain height direction, the grain height of the grain in the data is enlarged to a predetermined input grain height.

From the standpoint of reproducibility of the grain shape, the input grain height is greater than or equal to 120% of the stacking pitch of the 3D printing. However, the input grain height is more preferably greater than or equal to 200%, and even more preferably greater than or equal to 200% and less than or equal to 300%.

The input grain height is, for example, greater than or equal to 90 μm and less than or equal to 330 μm.

(4: Printing of Intermediate Product)

In this step, the input data is inputted to a 3D printer, and an intermediate product having an intermediate grain is printed.

The 3D printer is, as an example, an MJF 3D printer. MJF is an abbreviation for multi jet fusion, and roughly is the following method.

(a) A powder material is placed in the form of a thin layer.

(b) Ink is jetted-out onto the places that require printing, of the powder material that is placed in the form of a layer.

(c) By applying melting energy, the portions onto which ink was jetted are cured.

(d) Above-described steps (a)~(c) are repeated.

The 3D printing is carried out in a predetermined printing direction.

Figure 1:
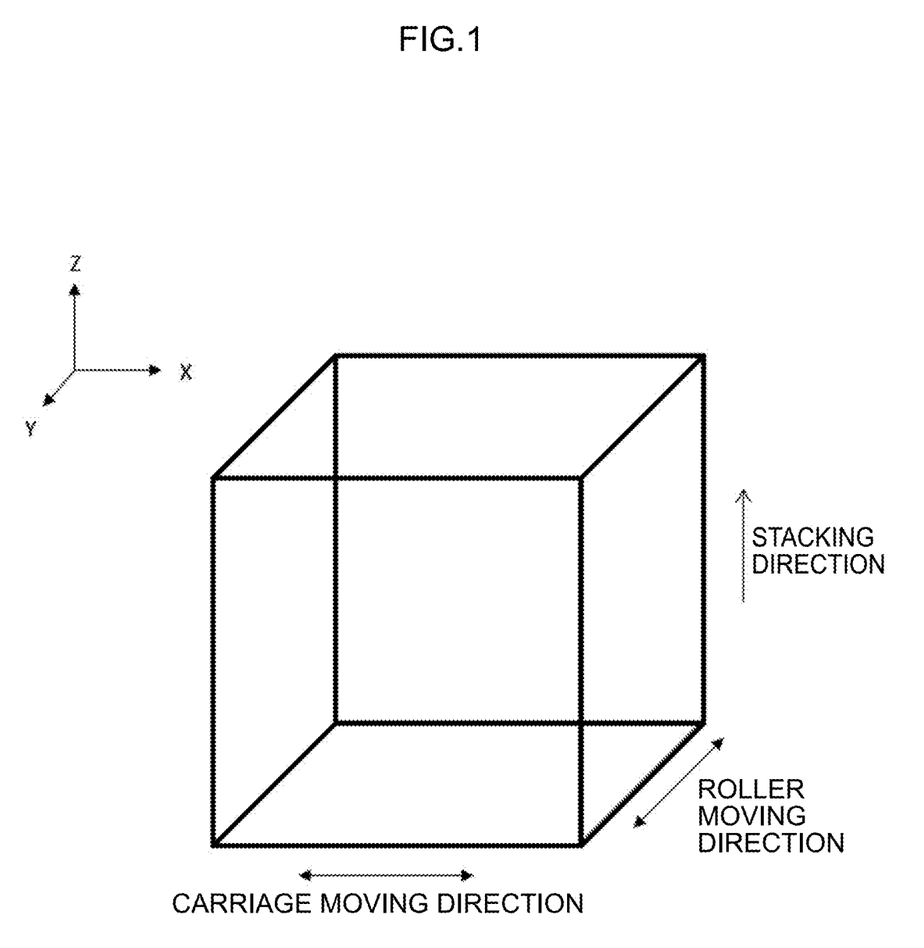
FIG. 1 is a drawing illustrating the relationship between stacking direction, carriage moving direction and roller moving direction in a 3D printer.
Figure 2:
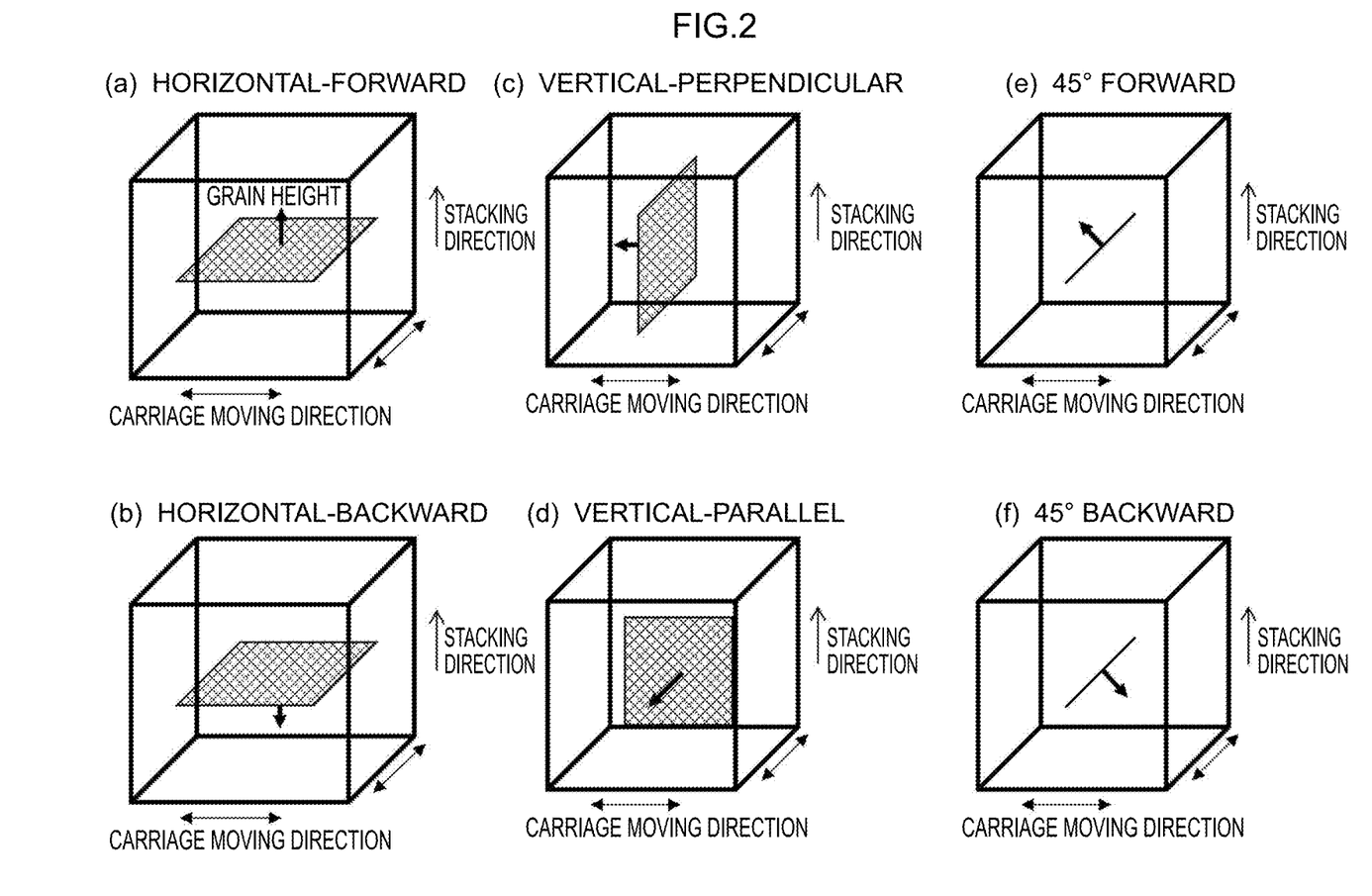
FIG. 2 is a drawing for explaining printing directions.

Printing direction is a concept expressing what type of posture the grain will be printed in, with respect to the structure of the 3D device. The printing direction is not particularly limited, and examples thereof are horizontal-forward, horizontal-backward, vertical-perpendicular, vertical-parallel, 45° forward, and 45° backward that are illustrated in FIG. 2. Note that the +Z direction illustrated in FIG. 1 is the stacking direction, the Y direction is the moving direction of the roller, and the X direction is the moving direction of the carriage. The roller is a structure for placing the powder material in the form of a thin layer, and the carriage is a structure for jetting-out ink.

As illustrated in FIG. 2,

Horizontal-forward means a printing direction in which the grain height direction is directed in the stacking direction.

Horizontal-backward means a printing direction in which the grain height direction is directed in the direction opposite the stacking direction.

Vertical-perpendicular means a printing direction in which the grain height direction is directed in the carriage moving direction.

Vertical-parallel means a printing direction in which the grain height direction is directed in the roller moving direction.

45° forward means a printing direction in which the grain height direction is directed in a direction that is 45° with respect to the stacking direction.

45° backward means a printing direction in which the grain height direction is directed in a direction that is 135° with respect to the stacking direction.

The 3D printer is not particularly limited, and MJF5200 (manufactured by HP Inc.) is used for example.

The stacking pitch in the 3D printing is determined by the performances and the settings of the 3D printer, and is not particularly limited, and is 60 to 100 μm for example.

The powder material is not particularly limited, and PA12 is used for example. The average particle diameter of the powder material is not particularly limited, and is, for example, greater than or equal to 50% and less than or equal to 80% of the stacking pitch, and is 40 to 60 μm for example.

(5: Post Processings)

In the post processing step, post processings are carried out on the intermediate product that has been printed, and the final product is obtained. Which processings are to be carried out as post processings are not particularly limited, and, for example, chemical polishing and the like are carried out. By undergoing the post processings, there are cases in which the grain height of the resin formed product that is the finished product is lower than the grain height of the intermediate product. The grain height of the resin formed product that is the finished product is 80 to 120 μm for example.

<Operation and Effects>

The operation and effects of the present embodiment are described next.

In the present embodiment, the grain height in the printing data (input data) that is inputted to the 3D printer in the 3D printing step is greater than or equal to 120% (and more preferably, greater than or equal to 200%) of the stacking pitch in the 3D printing step. Due thereto, as compared with a case in which the grain height in the input data is less than 120% of the stacking pitch, the shape of the leather grain can be reproduced well in the intermediate grain, and as a result, the reproducibility of the leather grain in the finished product can be improved.

Figure 3:
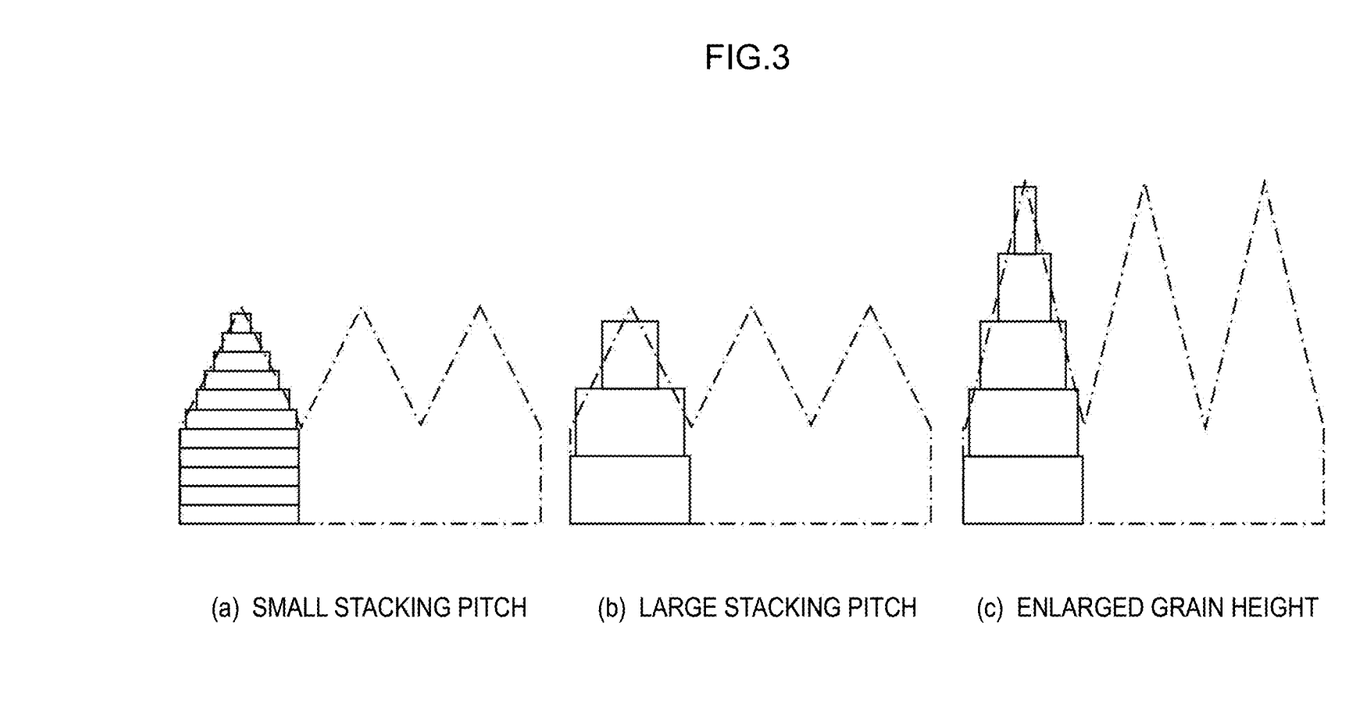
FIG. 3 is a drawing explaining effects of stacking pitch and grain height on reproducibility in cases in which the printing direction is horizontal.

FIG. 3 is a drawing explaining effects of stacking pitch and grain height on reproducibility, in a case in which the printing direction is horizontal (horizontal-forward or horizontal-backward).

FIG. 3(a) illustrates a case in which the stacking pitch is small, and FIG. 3(b) illustrates a case in which the stacking pitch is large. As can be understood from these drawings, when the stacking pitch is small, the reproducibility of the grain is good, and when the stacking pitch is large, the reproducibility is poor. Here, as illustrated in FIG. 3(c), by enlarging the grain height, it is easy to reflect the shape of the grain, for which reproduction is desired, in the printed product. As a result, adverse effects of the magnitude of the stacking pitch on the reproducibility can be reduced.

Figure 4:
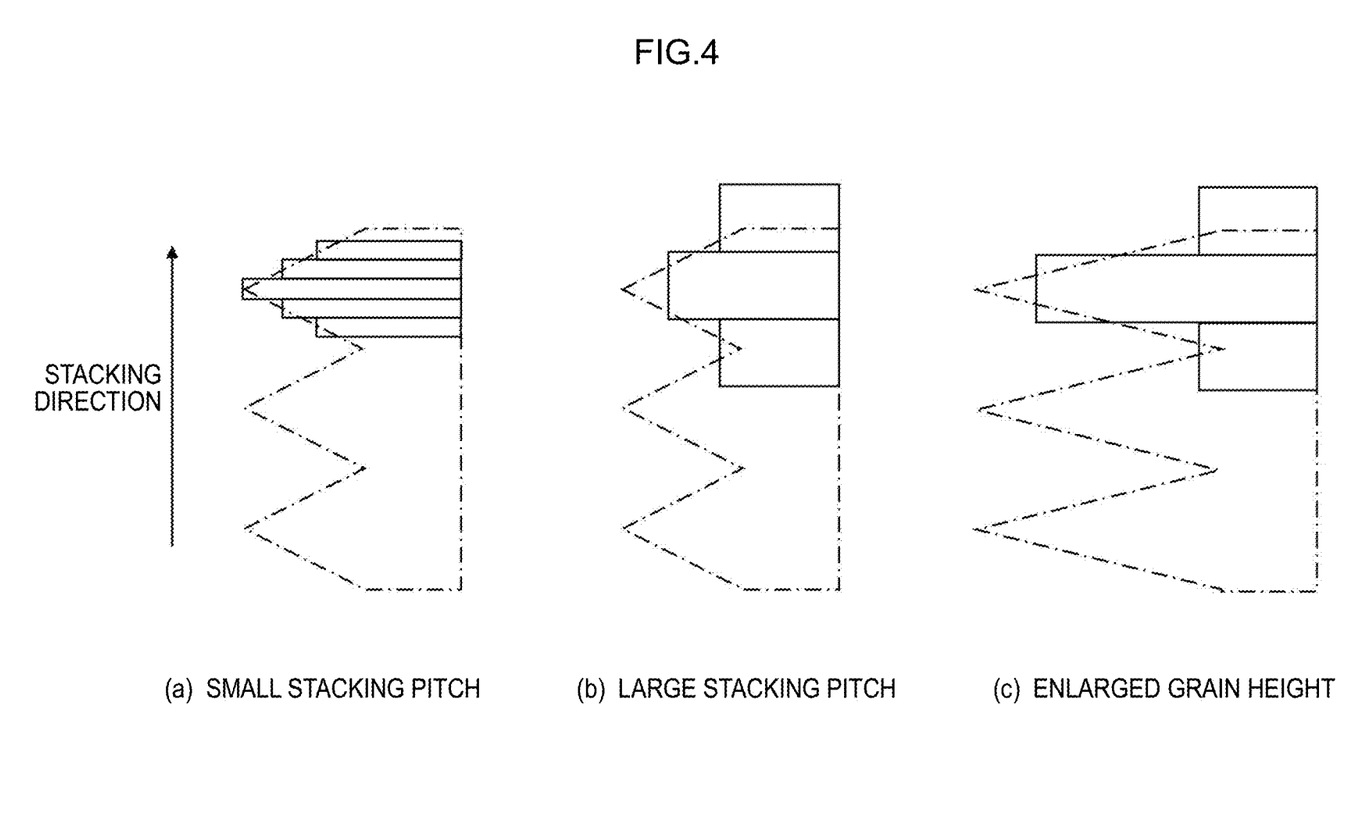
FIG. 4 is a drawing explaining effects of stacking pitch and grain height on reproducibility in cases in which the printing direction is vertical.

FIG. 4 is a drawing explaining effects of stacking pitch and grain height on reproducibility, in a case in which the printing direction is vertical (vertical-perpendicular or vertical-parallel).

FIG. 4(a) illustrates a case in which the stacking pitch is small, and FIG. 4(b) illustrates a case in which the stacking pitch is large. As can be understood from these drawings, when the stacking pitch is small, the reproducibility of the grain is good, and when the stacking pitch is large, the reproducibility is poor. Here, as illustrated in FIG. 4(c), by enlarging the grain height, it is easy to reflect the shape of the grain, for which reproduction is desired, in the printed product. As a result, adverse effects of the magnitude of the stacking pitch on the reproducibility can be reduced.

Figure 5:
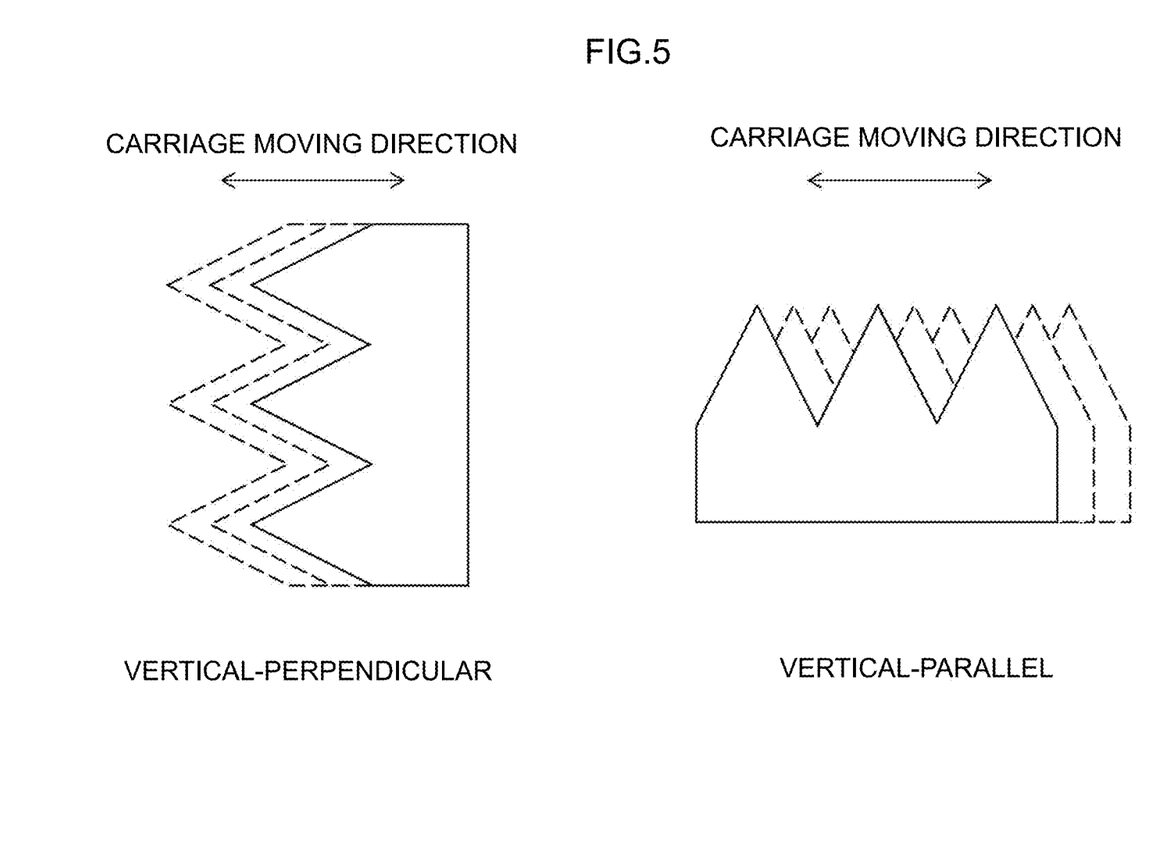
FIG. 5 is a drawing explaining differences in reproducibility between a case in which the printing direction is vertical-perpendicular and a case in which the printing direction is vertical-parallel.

FIG. 5 is a drawing explaining the difference in reproducibility between a case in which the printing direction is vertical-perpendicular and a case in which the printing direction is vertical-parallel.

Because the ink is applied while the carriage is moving, if an error occurs in the timing of applying the ink, an error arises in the application area in the carriage moving direction. Here, in a case in which the printing direction is vertical-parallel, if an error arises in the application area of the ink, the ink will be applied so as to fill-in the valleys of the grain. Therefore, an error in the application area greatly affects the reproducibility of the grain. In contrast, in a case in which the printing direction is vertical-perpendicular, the grain height direction is the same direction as the moving direction of the carriage. Therefore, even if an error arises in the application area of the ink, the effects of that error on the reproducibility of the grain are small.

By the way, if the grain height of the intermediate grain is low (e.g., if the grain height of the intermediate grain is less than 110% of the grain height of the leather grain that the resin formed product, which is the finished product, has), in the post processing step, it is difficult to reproduce the grain height of the leather grain that the resin formed product, which is the finished product, has.

Thus, it is preferable that the grain height of the intermediate grain is greater than or equal to 110% of the grain height of the leather grain that the resin formed product, which is the finished product, has.

EXAMPLES

Examples of the manufacturing method of the present invention are described next.

The powder material and the 3D printer (including the settings) were as follows.

powder material: PA12 (The average particle diameter is 50 μm.)

device: MJF5200 (mode: advance) (The stacking pitch is 80 μm.)

Three different types of actual articles (Type 1 through Type 3, refer to FIG. 7 through FIG. 9) were used as the actual article.

In the input data, there were three patterns in which the grain height was 100 μm, 200 μm, 300 μm.

The printing directions were the six patterns of horizontal-forward, horizontal-backward, vertical-perpendicular, vertical-parallel, 45° forward, 45° backward.

Namely, a total of 54 patterns (3×3×6) were implemented. Note each of the patterns was implemented plural times with the input data being re-prepared each time, and the average thereof was used as the result.

Figure 10:
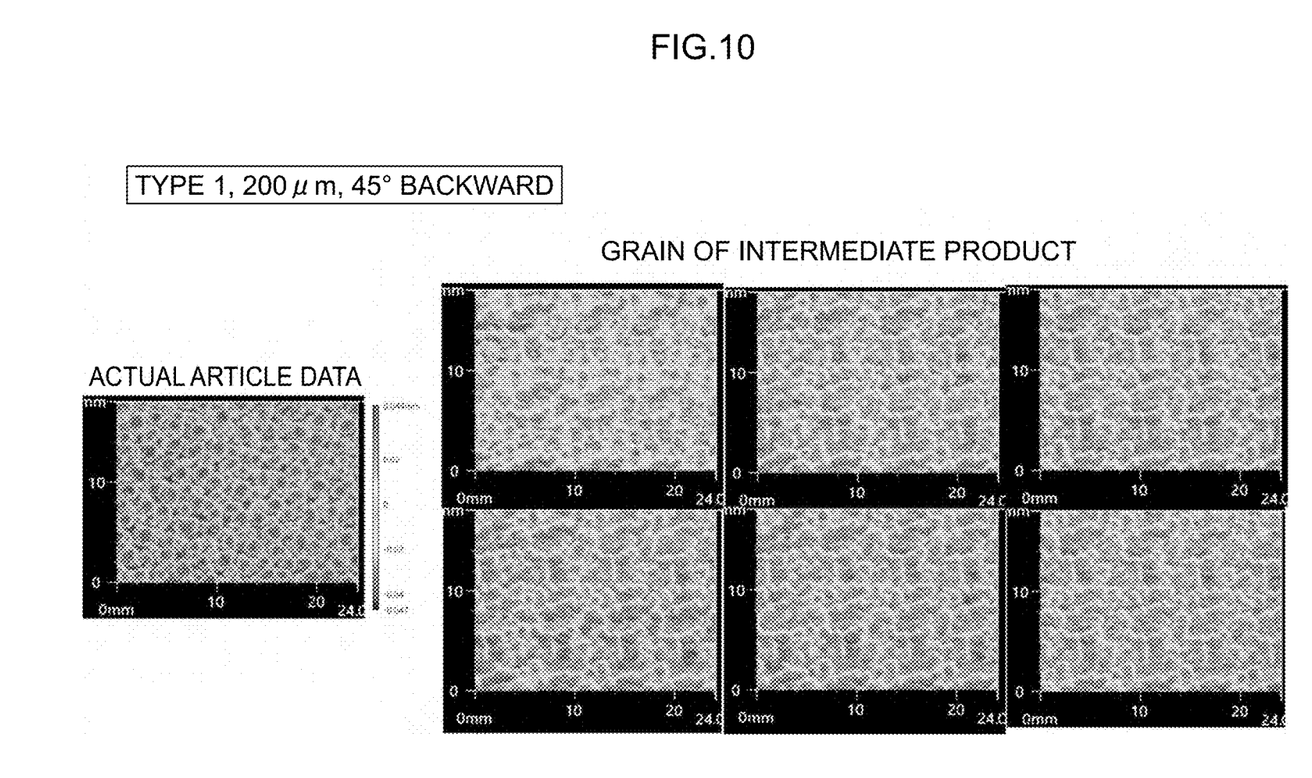
FIG. 10 is an example of a figure that compares the grain shape of an actual article and the grain shape of intermediate products formed by 3D printing.
Figure 11:
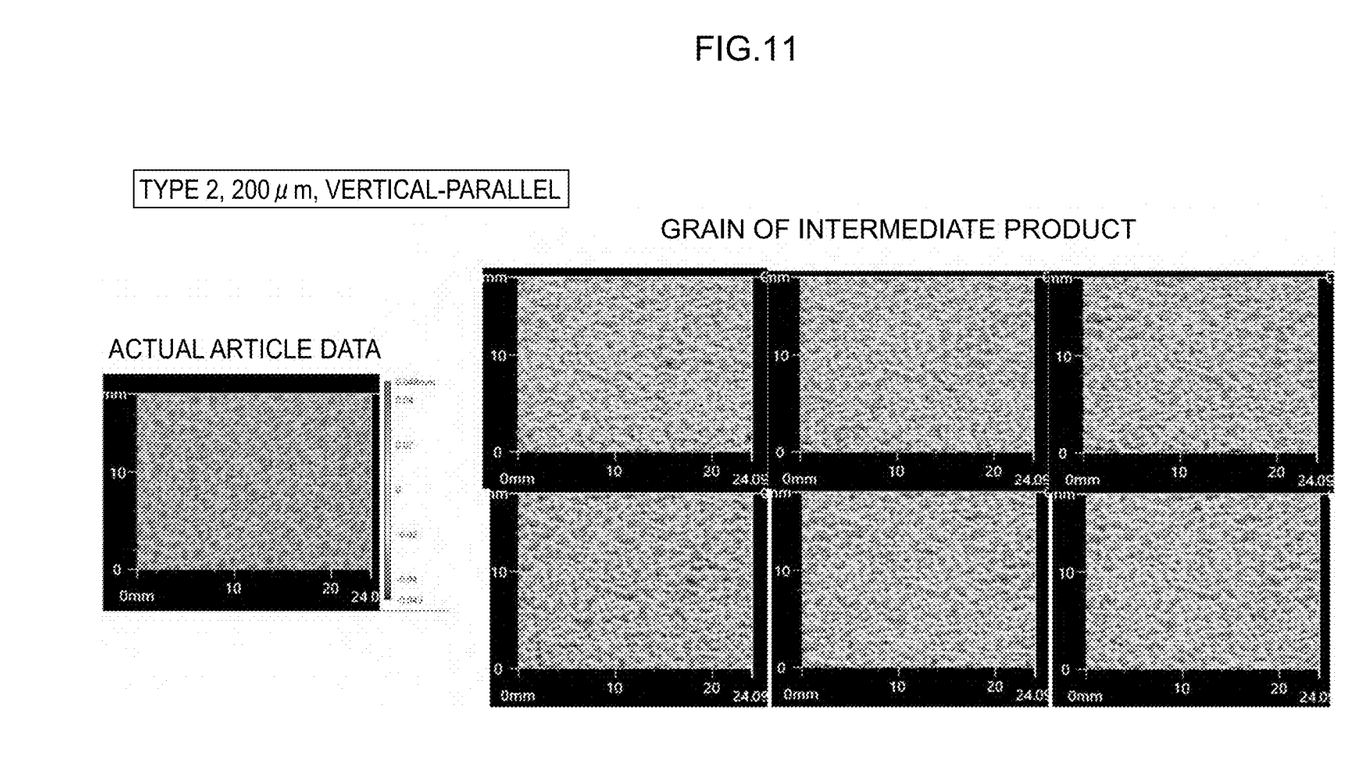
FIG. 11 is an example of a figure that compares the grain shape of an actual article and the grain shape of intermediate products formed by 3D printing.

As an example, the results of Type 1, 200 μm and 45° backward are illustrated in FIG. 10, and the results of Type 2, 200 μm and vertical-parallel are illustrated in FIG. 11. Note that the results of carrying out printing six times with the input data being re-prepared each time are shown as the patterns of the respective drawings.

Further, a compilation of all of the results is shown in Table 1.

TABLE 1

| actual article | stacking pitch | average particle diameter | printing direction | 100 μm grain height | 100 μm reproducibility | 200 μm grain height | 200 μm reproducibility | 300 μm grain height | 300 μm reproducibility |
|---|---|---|---|---|---|---|---|---|---|
| Type 1 | 80 | 50 | horizontal-forward | 167 | C | 250 | B | 319 | C |
| | | | horizontal-backward | 61 | C | 142 | A | 271 | B |
| | | | vertical-perpendicular | 133 | C | 246 | B | 348 | C |
| | | | vertical-parallel | 85 | B | 172 | A | 246 | B |
| | | | 45° forward | 148 | B | 214 | B | 301 | C |
| | | | 45° backward | 142 | B | 227 | B | 310 | C |
| Type 2 | 80 | 50 | horizontal-forward | 43 | C | 191 | B | 252 | C |
| | | | horizontal-backward | 55 | C | 123 | C | 136 | B |
| | | | vertical-perpendicular | 111 | C | 197 | B | 263 | C |
| | | | vertical-parallel | 70 | C | 121 | C | 148 | B |
| | | | 45° forward | 87 | C | 173 | C | 228 | C |
| | | | 45° backward | 100 | C | 174 | C | 264 | C |
| Type 3 | 80 | 50 | horizontal-forward | 57 | C | 232 | B | 301 | C |
| | | | horizontal-backward | 41 | C | 112 | B | 127 | B |
| | | | vertical-perpendicular | 104 | C | 173 | B | 195 | C |
| | | | vertical-parallel | 64 | C | 92 | B | 161 | C |
| | | | 45° forward | 106 | B | 176 | B | 280 | C |
| | | | 45° backward | 94 | B | 186 | B | 270 | C |

"Grain height" in Table 1 is the grain height in the intermediate product obtained by the 3D printing. "Reproducibility" in Table 1 is the evaluation from the standpoint of whether the grain shape of the actual article could be reproduced. All of A, B, C are reproducibilities that can withstand use, but B is more preferable than C, and A is more preferable than B.

As can be understood from Table 1, reproducibilities that can withstand use were obtained for each of the patterns of 100 μm, 200 μm, 300 μm. However, there were many results in which 200 μm and 300 μm were more preferable than 100 μm, and there were many results in which, thereamong, 200 μm was the more preferable. Further, the Examples in which the printing direction was vertical-parallel had more results of good reproducibility than Examples in which the printing direction was vertical-perpendicular.

With regard to the grain height, in the Examples in which the input grain height was 100 μm, there were occasionally results in which the grain height of the intermediate grain was not sufficient (approximately greater than or equal to 100 μm), whereas, in the Examples in which the input grain height was 200 μm and 300 μm, a sufficient height was obtained in all of the patterns. Note that the grain height of the finished product that has undergone the post processing step is preferably approximately 80 to 120 μm, and therefore, the height needed for the grain height of the intermediate product is approximately 100 μm as described above.

Although the manufacturing method relating to the present invention has been described above by using the Examples, the present invention is not limited to this.

(Explanation of Modified Examples)

Note that, although the above describes a method of using an MJF 3D printer as the 3D printer, the present disclosure is not limited to this. For example, the following types of 3D printers can be used as the 3D printer.

SLS (Selective Laser Sintering)

binder jetting

SLA (Stereo Lithography Apparatus)

SLS is roughly the following method.

(a) A powder material is placed in the form of a thin layer.
(b) A laser is illuminated onto, of the powder material that is placed in a layer form, the portions that are needed for printing, and melting energy is applied, and these portions are cured.
(c) Above-described steps (a)-(b) are repeated.

Binder jetting is roughly the following method.

(a) A powder material is placed in the form of a thin layer.
(b) A binder is jetted-out onto, of the powder material that is placed in a layer form, the portions that are needed for printing, and these portions are cured.
(c) Above-described steps (a)-(b) are repeated.

SLA is roughly the following method.

(a) The platform on which the printed object is to be built is immersed in a pool filled with a liquid material.
(b) The position of the platform is disposed at a position that is beneath the liquid surface, by an amount corresponding to the height of a thin layer.
(c) A laser is illuminated onto the liquid surface at only the portions that are needed for printing, and these portions are cured.
(d) The position of the platform is lowered from the position of (c) by an amount corresponding to the height of a thin layer, and the liquid is disposed at the lowered height.
(e) Above-described steps (c)-(d) are repeated.

MJF, SLS, binder jetting and SLA are all 3D printing methods using resin materials, and further, printing is carried out layer-by-layer, and these methods include the concept of a stacking pitch (the thickness per layer). Note that the stacking pitch in the 3D printing of these respective methods is determined by the performances and the settings of the 3D printer, and is not particularly limited, and is 60 to 100 μm for example. Therefore, the method of the present invention is effective in all of the above-described methods. For example, by making the grain height in the input data be greater than or equal to 120% (preferably greater than or equal to 200%, and more preferably greater than or equal to 200% and less than or equal to 300%) of the stacking pitch in any of the above-described methods, the reproducibility of the leather grain can be improved.

In particular, both MJF and SLS are resin powder bed fusion methods. A resin powder bed fusion method means a powder bed melting method using a resin powder material. In MJF, ink and melting energy are used in order to cure the powder material, whereas SLS differs with regard to the point of using a laser in order to cure the powder material. However, it is thought this difference has little effect on the effects of the present invention. Accordingly, the effects of the Examples that were carried by using MJF are particularly suited to SLS as well.

The invention claimed is:

1. A method of manufacturing a resin formed product having a leather grain, the manufacturing method comprising:
   a 3D printing step of inputting printing data to a 3D printer, and printing an intermediate product having an intermediate grain that is a base of the leather grain; and
   a post processing step of obtaining the resin formed product, which is a finished product, by carrying out post processing on the intermediate product printed in the 3D printing step,
   wherein a grain height in input data, which is the printing data that is inputted in the 3D printing step, is greater than or equal to 120% of a stacking pitch in the 3D printing step.

2. The manufacturing method of claim 1, wherein the grain height in the input data is greater than or equal to 200% of the stacking pitch.

3. The manufacturing method of claim 1, wherein:
   a grain height of the leather grain of the resin formed product, which is the finished product, is from 70% to 130% of the stacking pitch, and
   the grain height in the input data is less than or equal to 300% of the stacking pitch.

4. The manufacturing method of claim 1, wherein:
   a grain height of the leather grain of the resin formed product, which is the finished product, is from 70% to 130% of the stacking pitch, and
   the grain height in the input data is from 200% to 300% of the stacking pitch.

5. The manufacturing method of claim 1, further comprising a data preparing step of preparing the input data,
   wherein, in the data preparing step, the input data is prepared by expanding actual article data in a grain height direction.

6. The manufacturing method of claim 1, wherein the 3D printer is an MJF 3D printer.

* * * * *